United States Patent
Li et al.

(10) Patent No.: US 9,600,329 B2
(45) Date of Patent: Mar. 21, 2017

(54) VIRTUAL MACHINE MIGRATION METHOD, SWITCH, AND VIRTUAL MACHINE SYSTEM

(71) Applicant: Huawei Technologies Co., Ltd., Shenzhen, Guangdong (CN)

(72) Inventors: Guang Li, Shenzhen (CN); Ming Zheng, Nanjing (CN); Yizhou Li, Nanjing (CN); Jin Li, Nanjing (CN); Wei Song, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 13/939,886

(22) Filed: Jul. 11, 2013

(65) Prior Publication Data

US 2013/0311991 A1    Nov. 21, 2013

Related U.S. Application Data

(63) Continuation of application No. PCT/CN2011/078932, filed on Aug. 25, 2011.

(30) Foreign Application Priority Data

Jan. 13, 2011  (CN) .......................... 2011 1 0006732

(51) Int. Cl.
*G06F 15/16* (2006.01)
*G06F 9/48* (2006.01)
*H04L 29/12* (2006.01)
*G06F 9/455* (2006.01)

(52) U.S. Cl.
CPC ........ *G06F 9/4856* (2013.01); *G06F 9/45558* (2013.01); *H04L 61/103* (2013.01); *H04L 61/2015* (2013.01); *G06F 2009/4557* (2013.01)

(58) Field of Classification Search
CPC ..... H04L 49/70; H04L 49/356; H04L 61/103; H04L 12/4641; H04L 45/021;
(Continued)

(56) References Cited

U.S. PATENT DOCUMENTS

2009/0070760 A1   3/2009  Khatri et al.
2009/0150529 A1   6/2009  Tripathi
(Continued)

FOREIGN PATENT DOCUMENTS

CN    101299893 A    11/2008
CN    101382906 A    3/2009
CN    101739287 A    6/2010

OTHER PUBLICATIONS

Kashyap et al., Automating Virtual Machine Network Profiles, Jul. 2010, Proceedings of the Linux Symposium, www.kernel.org/doc/ols/2010/ols2010-pages-147-152.pdf.*
(Continued)

*Primary Examiner* — Ruolei Zong
(74) *Attorney, Agent, or Firm* — Huawei Technologies Co., Ltd.

(57) ABSTRACT

The present invention provides a virtual machine migration method, a switch, a virtual machine system. A switch receives a message sent by a server, where the message is used to enable the switch to discover a connected virtual machine interface; obtains, from the message, an identifier for indicating whether a virtual machine is migrated; and determines whether the virtual machine is a virtual machine migrated to the server according to the identifier indicating whether the virtual machine is migrated. According to the embodiments of the present invention, it may be determined whether an added virtual machine on a server is a newly created one or a migrated one.

12 Claims, 4 Drawing Sheets

| Reason | VSI Mgr ID | VSI Type ID | VSI Type Version | VSI Instance ID | MAC/VLAN Format | MAC/VLANs |
|---|---|---|---|---|---|---|

(58) Field of Classification Search
CPC ............ H04L 61/6022; H04L 63/0272; G06F 2009/45595; G06F 9/45558; G06F 13/4022; G06F 9/455; G06F 9/5088
USPC ....... 709/206, 204, 205, 207, 217, 223, 224, 709/225, 227, 238, 226
See application file for complete search history.

(56) References Cited

U.S. PATENT DOCUMENTS

| | | | |
|---|---|---|---|
| 2010/0146093 A1* | 6/2010 | Kuik | 709/223 |
| 2010/0165877 A1 | 7/2010 | Shukia | |
| 2010/0322255 A1* | 12/2010 | Hao et al. | 370/398 |
| 2011/0153715 A1* | 6/2011 | Oshins et al. | 709/203 |
| 2011/0265164 A1* | 10/2011 | Lucovsky et al. | 726/7 |
| 2012/0177039 A1* | 7/2012 | Berman | 370/390 |

OTHER PUBLICATIONS

Recio, R. et al., "Ethernet Virtual Bridging Automation Use Cases," 22nd International Teletraffic Congress, Sep. 7-9, 2010, Amsterdam, The Netherlands, Sep. 7, 2009, pp. 1-10, XP002684764.

Woundy Comcast Cable K Kinnear Cisco Systems R:"Dynamic Host Configuration Protocol(DHCP) Leasequery; rfc4388.txt",Feb. 1, 2006,total 27 pages,XP015044820.

Li Huawei Technologies Y:"Problem statement on address resolution in virtual machine migration;draft-liyz-armd-vm-migration-ps-00,txt",Internet Engineering Task Force,IETF; Standardworkingdraft,Internet Society(ISOC) 4,Oct. 18, 2010,pp. 1-9,XP015071854.

"Migration Indicator on VDP Req; bg-yizhou-migration-indicator-0114-v01", IEEE Draft;Jan. 13, 2011,pp. 1-7, XP017643466.

P. Kurapati et al., "DHCPv4 lease query by Relay Agent Remote ID," draft-ietf-dhc-leasequery-by-remote-id-07.txt, DHC Working Group, Internet-Draft, Updates: 4388 (if approved), dated Oct. 8, 2010,total 19 pages.

Search report issued in corresponding PCT application No. PCT/CN2011/078932, dated Dec. 8, 2011, total 13 pages.

IEEE P802.1Qbg/D 1.3:"Draft Standard for Local and Metropolitan Area Networks-Virtual Bridged Local Area networks-Amendment XX: Edge Virtual Bridging", dated Dec. 20, 2010, total 157 pages.

R. Woundy, "Dynamic Host Configuration Protocol (DHCP) Leasequery," Network Working Group, rfc4388, dated Feb. 2006, total 25 pages.

* cited by examiner

| TLV type | TLV information string length | TLV information string |
|---|---|---|

FIG. 1

| Reason | VSI Mgr ID | VSI Type ID | VSI Type Version | VSI Instance ID | MAC/VLAN Format | MAC/VLANs |
|---|---|---|---|---|---|---|

VIRTUAL MACHINE MIGRATION METHOD, SWITCH, AND VIRTUAL MACHINE SYSTEM

CROSS-REFERENCE TO RELATED APPLICATIONS

This application is a continuation of International Application No. PCT/CN2011/078932, filed on Aug. 25, 2011, which claims priority to Chinese Patent Application No. 201110006732.8, filed on Jan. 13, 2011, both of which are hereby incorporated by reference in their entireties.

FIELD OF THE INVENTION

The present invention relates to the field of communications technologies, and in particular, to a virtual machine migration method, a switch, and a virtual machine system.

BACKGROUND OF THE INVENTION

The VM (virtual machine) technology refers to virtualizing one server into a plurality of virtual machines isolated from each other, or virtualizing a plurality of servers into one virtual machine, so as to improve utilization rate of resources and simplify system management.

VM real-time migration refers to migration of a running virtual machine from one server to another in real time. In-migration and out-migration of the VM may be achieved by using the VDP (Virtual Station Interface, VSI, Discovery and Configuration Protocol) to implement network-based configuration of the VM real-time migration. A general procedure of the existing VDP is as follows:

When a server creates a VM or a VM is migrated to a server, the server sends a pre-associate message to a switch. The switch obtains a VSI type according to the pre-associate message, and obtains, according to the message, parameters from a VSI database to configure the switch. When receiving an associate message sent by the server, the configuration of the switch is enabled.

When a server deletes a VM or a VM is migrated out from a server, the server sends a de-associate message to a switch.

Figure 1:
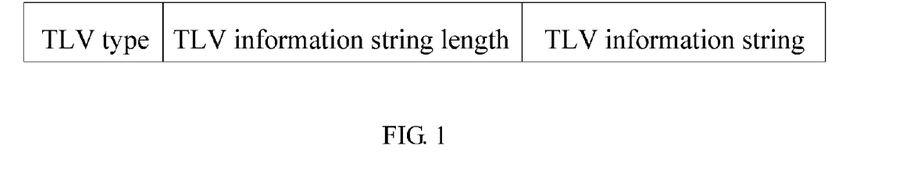
FIG. 1 is an existing message format of a VDP message.

In the prior art, a format of a VDP message is shown in FIG. 1, including a TLV (type length value) data packet header and a TLV information string. As shown in FIG. 1, the TLV data packet header includes the following fields:

TLV type field: identifies the type of the message; the type may include pre-associate message, associate message, and de-associate message; and TLV information string length: identifies the length of the TLV information string.

Figure 2:
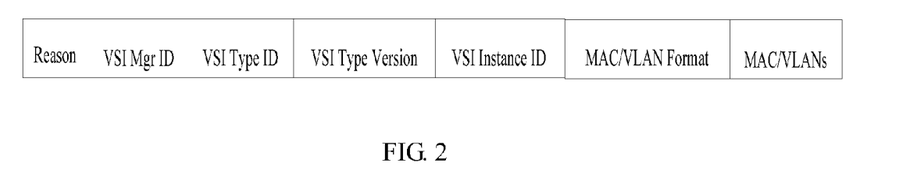
FIG. 2 is a format of a TLV information string of the VDP message in FIG. 1.

As shown in FIG. 2, an existing TLV information string may include the following fields:

Reason, VSI Mgr ID (virtual station interface management ID), VSI Type ID (virtual station interface type ID), VSI Type Version (virtual station interface type version), VSI Instance ID (virtual station interface instance ID), MAC/VLAN Format, and MAC/VLANs (MAC, media access control; VLAN, virtual local area network).

During the implementation of the present invention, the inventor discovers that the prior art has at least the following disadvantages:

In the prior art, when a VM is migrated to or created on a server, the server will send a VDP message to a switch, resulting in that the switch fails to accurately acquire migration of the VM from the VDP message. In this case, the switch fails to timely establish a binding relationship for the migrated VM, thereby affecting timeliness of services.

SUMMARY OF THE INVENTION

To solve the problem that a switch fails to acquire migration of a virtual machine in the prior art, embodiments of the present invention provide a virtual machine migration method, a switch, and a virtual machine system. The technical solutions are as follows:

A first aspect of the present invention provides a virtual machine migration method, the method includes: receiving a message sent by a server, where the message is used to enable the switch to discover a connected virtual machine interface; obtaining, from the message, an identifier for indicating whether a virtual machine is migrated; determining, according to the identifier indicating whether the virtual machine is migrated, whether the virtual machine is a virtual machine that is migrated to the server.

A second aspect of the present invention provides a switch, the switch includes: a receiving module, configured to receive a message sent by a server, where the message is used to enable the switch to discover a connected virtual machine interface; and a first obtaining module, configured to obtain, from the message, an identifier for indicating whether a virtual machine is migrated, and determine, according to the identifier indicating whether the virtual machine is migrated, whether the virtual machine is a virtual machine that is migrated to the server.

A third aspect of the present invention provides a virtual machine system, the system includes a server and a switch. The server is configured to: when a virtual machine is migrated to the server, send a message to the switch, where the message is used to enable the switch to discover a connected virtual machine interface; and the switch is configured to receive the message, obtain, from the message, an identifier for indicating whether the virtual machine is migrated, and determine, according to the identifier indicating whether the virtual machine is migrated, whether the virtual machine is a virtual machine that is migrated to the server.

In the present invention, it may be determined whether an added virtual machine on a server is a newly created one or a migrated one by receiving a message sent by the server and according to an identifier field in the message. In this way, compared with the prior art, it may be accurately acquired whether a virtual machine is migrated to the server.

BRIEF DESCRIPTION OF THE DRAWINGS

To illustrate the technical solutions in the embodiments of the present invention more clearly, the following briefly describes the accompanying drawings required for describing the embodiments. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

To make the objectives, technical solutions, and advantages of the present invention more comprehensible, the following describes the embodiments of the present invention in further detail below with reference to the accompanying drawings.

Embodiment 1

Figure 3:
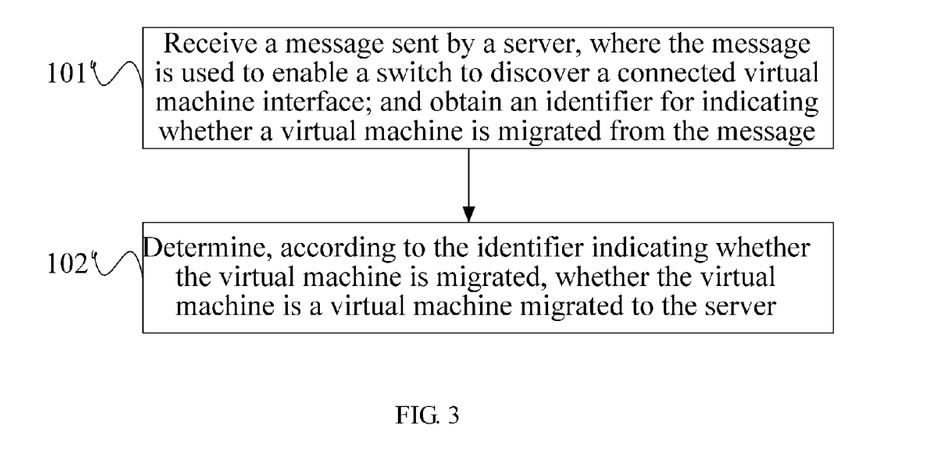
FIG. 3 is a schematic flow chart according to a first embodiment of the present invention.

A first embodiment of the present invention provides a virtual machine migration method, and the procedure of the method is shown in FIG. 3, including:

Step 101: Receive a message sent by a server, where the message is used to enable a switch to discover a connected virtual machine interface; and obtain, from the message, an identifier for indicating whether a virtual machine is migrated.

Step 102: Determine, according to the identifier indicating whether the virtual machine is migrated, whether the virtual machine is a virtual machine that is migrated to the server.

In the embodiment of the present invention, it may be determined whether an added virtual machine on a server is a newly created one or a migrated one by receiving a message sent by the server and according to an identifier field in the message. In this way, compared with the prior art, it may be accurately acquired whether a virtual machine is migrated to the server.

Embodiment 2

A second embodiment of the present invention provides a virtual machine migration method, which is improved based on the first embodiment. Furthermore, when a switch acquires that a virtual machine is migrated to a server, services corresponding to the virtual machine bound to ports of the switch may be further migrated. The following uses migration in the DHCP (Dynamic Host Configuration Protocol) snooping technology as an example to further describe the embodiment of the present invention.

DHCP snooping is a security feature of the DHCP protocol. Untrustworthy DHCP information is filtered by creating and maintaining a DHCP snooping user binding table. The DHCP snooping user binding table includes parameters such as a MAC address, an IP address, lease time, and a VLAN-ID interface of the user in an untrustworthy zone. After DHCP snooping is enabled on an existing switch, the switch snoops DHCP messages, and may extract and record parameters, such as an IP address and a MAC address, from a received DHCP Request or DHCP Ack message.

Figure 4:
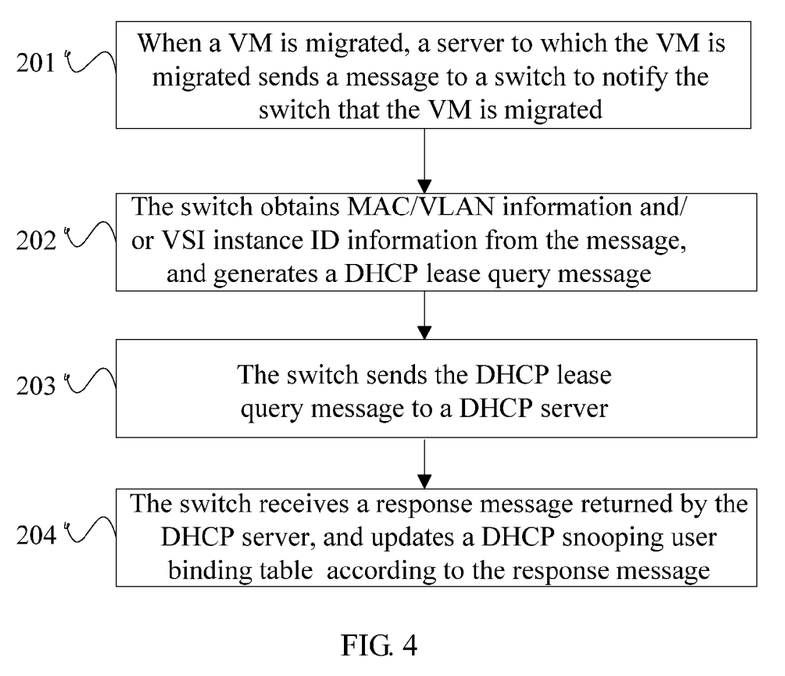
FIG. 4 is a schematic flow chart of a service migration method according to a second embodiment of the present invention.

In an embodiment of the present invention, the switch may trigger a DHCP server to return a response message to update the DHCP snooping user binding table. The procedure is shown in FIG. 4, including:

Step 201: When a VM is migrated, a server to which the VM is migrated sends a message to a switch to notify the switch that the VM is migrated, where the message is used to enable the switch to discover a connected virtual machine interface, and the message includes at least an identifier field or flag bit indicating whether the VM is migrated.

The existing VDP message may be extended by adding a VSI property field for indicating VM migration in a TLV information string. The existing TLV information string is shown in FIG. 2. According to the embodiment of the present invention, a VSI property field may be added at any position in the TLV information string of the VDP message as shown in FIG. 2. Assuredly, a bit may be added in a Reason field in the TLV information string as a flag bit. When the flag bit is 0, the VM is a newly created one. When the flag bit is 1, the VM is a newly migrated one.

Step 202: The switch obtains MAC/VLAN information and/or VSI instance ID information from the message, and generates a DHCP lease query message.

In the prior art, a 6-byte-MAC address and a 2-byte-VLAN ID are stored in a MAC/VLAN field of the VDP message; and a globally unique identifier of the VM is stored in a VSI instance ID. The switch may generate a corresponding DHCP lease query message according to any of the two fields, which belongs to the prior art, and is not detailed herein again.

Step 203: The switch sends the DHCP lease query message to a DHCP server.

Step 204: The switch receives a response message returned by the DHCP server, and updates a DHCP snooping user binding table in the manner disclosed in the prior art.

The method for updating the DHCP snooping user binding table according to the response message returned by the DHCP server belongs to the prior art, which is not detailed herein.

In the existing RFC 4388 standard formulated by the IETF (Internet Engineering Task Force), a DHCP lease relay message is allowed to query information of DHCP lease time from a DHCP server by using any one of parameters including a MAC address, an IP address, and a Client-Identifier. Information of the DHCP lease time of a VM may be searched by using a remote-id sub-option under option 82 in the extended protocol of the RFC 4388 standard.

Figure 5:
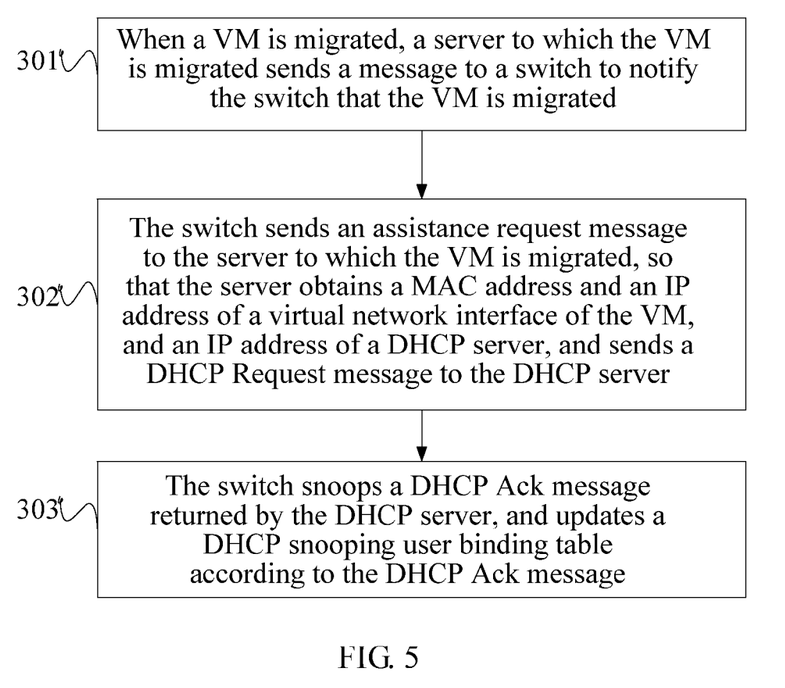
FIG. 5 is a schematic flow chart of another service migration method according to the second embodiment of the present invention.

In another embodiment of the present invention, a server may also send a DHCP request message, and update a DHCP snooping user binding table by parsing a DHCP ack (DHCP response) message returned by a DHCP server. The procedure is shown in FIG. 5, including:

Step 301: When a VM is migrated, the server to which the VM is migrated sends a message to a switch to notify the switch that the VM is migrated, where the message is used to enable the switch to discover a connected virtual machine interface, and the message includes at least an identifier field or flag bit indicating whether the VM is migrated.

The existing VDP message may be extended by adding a VSI property (VSI property) field for indicating VM migration in the TLV information string. The existing TLV information string is shown in FIG. 2. According to the embodiment of the present invention, a VSI property field may be added at any position in the TLV information string of the VDP message as shown in FIG. 2. Assuredly, a bit may be added in a Reason field in the TLV information string as a flag bit. When the flag bit is 0, the VM is a newly created one. When the flag bit is 1, the VM is a newly migrated one.

Step 302: The switch sends an assistance request message to the server to which the VM is migrated, so that the server obtains a MAC address and an IP address of a virtual network interface of the VM, and an IP address of a DHCP server, and sends a DHCP Request message to the DHCP server.

The server may obtain the MAC address and IP address of the virtual network interface of the virtual machine, and the IP address of the DHCP server by using any method, which is not limited in the embodiment of the present invention.

The existing VDP message may be extended by adding an identifier field for indicating a request for assistance from a server in the TLV information string. The existing TLV information string is shown in FIG. 2. According to the embodiment of the present invention, an identifier field may be added at any position in the TLV information string of the VDP message as shown in FIG. 2. After receiving the VDP message, the server parses the VDP message to determine, according to the flag bit, whether to send a DHCP Request message to the DHCP server.

Step 303: The switch snoops a DHCP Ack message returned by the DHCP server, and updates a DHCP snooping user binding table according to the DHCP Ack message.

The method for updating the DHCP snooping user binding table according to the DHCP Ack message belongs to the prior art, which is not detailed herein.

The following uses migration of a multicast group corresponding to the VM as an example to further describe the embodiment of the present invention.

In another embodiment of the present invention, a switch may instruct a VM to send an IGMP (Internet Group Management Protocol) report message to a multicast router to enable the VM to immediately join a multicast group. In the prior art, when the switch is using network programs that provide video services, such as, IPTV, video streams, and games, video traffic may be distributed to all connected ports because such type of traffic has generally a multicast Ethernet address. IGMP snooping may be enabled to create a multicast group for locating the traffic to a user that requests the traffic. IGMP querier of the switch may initiate an IGMP member query and allow nodes that request the traffic to make a response.

Figure 6:
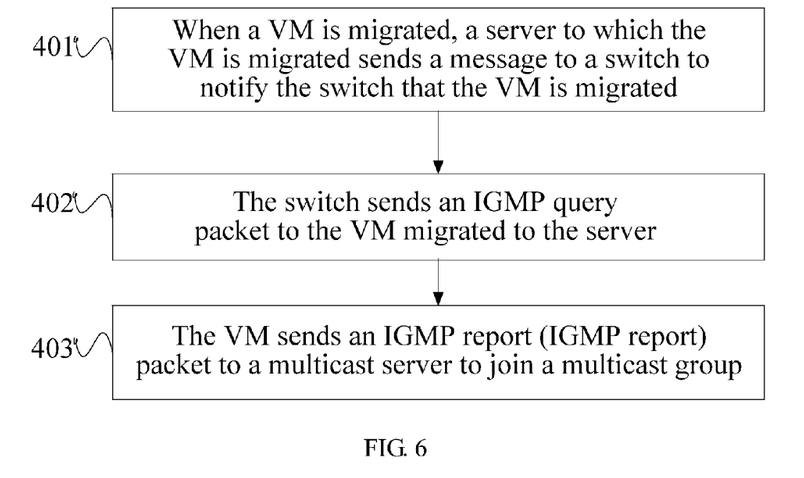
FIG. 6 is a schematic flow chart of another service migration method according to the second embodiment of the present invention.

Therefore, the procedure of this embodiment is shown in FIG. 6, including:

Step 401: When a VM is migrated, a server to which the VM is migrated sends a message to a switch to notify the switch that the VM is migrated, where the message is used to enable the switch to discover a connected virtual machine interface, and the message includes at least an identifier field or flag bit indicating whether the VM is migrated.

The existing VDP message may be extended by adding a VSI property field for indicating VM migration in the TLV information string. The existing TLV information string is shown in FIG. 2. According to the embodiment of the present invention, a VSI property field may be added at any position in the TLV information string of the VDP message as shown in FIG. 2. Assuredly, a bit may be added in a Reason field in the TLV information string as a flag bit. When the flag bit is 0, the VM is a newly created one. When the flag bit is 1, the VM is a newly migrated one.

Step 402: The switch sends an IGMP query message to the VM migrated to the server.

Step 403: The VM sends an IGMP report message to a multicast server to join a multicast group.

Step 403 belongs to the prior art. In the prior art, after receiving an IGMP query message, a VM sends an IGMP report; and a multicast server adds the VM to a multicast group after receiving the IGMP report.

According to the embodiment of the present invention, the VDP message may be extended by adding an identifier field or flag bit in the TLV information string of the VDP message, so as to notify the switch that the VM is migrated. Furthermore, according to the embodiment of the present invention, services bound to ports of the VM may be migrated to reduce the maintenance cost and improve timeliness of service access after VM migration.

Embodiment 3

Figure 7:
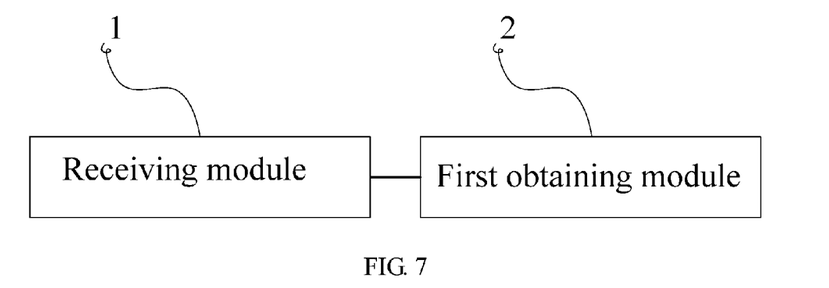
FIG. 7 is a schematic structural diagram according to a third embodiment of the present invention.

A third embodiment of the present invention provides a switch, and the structure of the switch is shown in FIG. 7, including:

a receiving module 1, configured to receive a message sent by a server, where the message is used to enable the switch to discover a connected virtual machine interface; and a first obtaining module 2, configured to obtain, from the message, an identifier for indicating whether a virtual machine is migrated, and determine, according to the identifier indicating whether the virtual machine is migrated, whether the virtual machine is a virtual machine that is migrated to the server.

In the embodiment of the present invention, it may be determined whether an added virtual machine on a server is a newly created one or a migrated one by receiving a message sent by the server and according to an identifier field in the message. In this way, compared with the prior art, it may be accurately acquired whether a virtual machine is migrated to the server.

Embodiment 4

A fourth embodiment of the present invention provides a switch, which is improved based on the third embodiment. Furthermore, when a switch accurately acquires that a virtual machine is migrated to a server, services corresponding to the virtual machine bound to ports of the switch may be further migrated. The following uses migration in the DHCP snooping technology as an example to further describe the embodiment of the present invention.

DHCP snooping is a security feature of the DHCP protocol. Untrustworthy DHCP information is filtered by creating and maintaining a DHCP snooping user binding table. The DHCP snooping user binding table includes parameters such as a MAC address, an IP address, lease time, and a VLAN-ID interface of the user in an untrustworthy zone. After DHCP snooping is enabled on an existing switch, the switch snoops DHCP messages, and may extract and record parameters, such as an IP address and a MAC address, from a received DHCP Request or DHCP Ack message.

Figure 8:
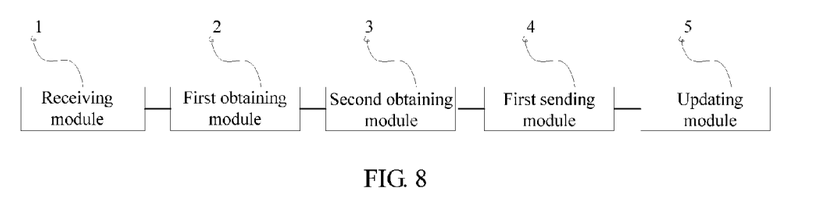
FIG. 8 is a schematic structural diagram of a switch according to a fourth embodiment of the present invention.

In an embodiment of the present invention, the switch may trigger a DHCP server to return a response message to update the DHCP snooping user binding table. That is, the structure of the switch according to the embodiment of the present invention may be as shown in FIG. 8, including:

a receiving module 1, configured to receive a message sent by a server, where the message is used to enable the switch to discover a connected virtual machine interface; and a first obtaining module 2, configured to obtain, from the message, an identifier for indicating whether the virtual machine is migrated, and determine, according to the identifier indicating whether the virtual machine is migrated, whether the virtual machine is a virtual machine that is migrated to the server.

In the embodiment of the present invention, when a VM is migrated, a server to which the VM is migrated sends a message to a switch to notify the switch that the VM is migrated, where the message includes at least an identifier field or flag bit for indicating whether the VM is migrated.

The existing VDP message may be extended by adding a VSI property field for indicating VM migration in the TLV information string. The existing TLV information string is shown in FIG. 2. According to the embodiment of the present invention, a VSI property field may be added at any position in the TLV information string of the VDP message as shown in FIG. 2. Assuredly, a bit may be added in a Reason field in the TLV information string as a flag bit. When the flag bit is 0, the VM is a newly created one. When the flag bit is 1, the VM is a newly migrated one.

When the switch parses the VDP message to acquire that a VM is migrated to the server, the switch may migrate the DHCP snooping service bound to the port. That is, the switch is shown in FIG. 8, further including:

a second obtaining module 3, configured to obtain MAC/VLAN information and/or VSI instance ID information from the message;

a first sending module 4, configured to generate a DHCP lease query message according to the MAC/VLAN information and/or VSI instance ID information, and send the lease query message to a DHCP server; and an updating module 5, configured to receive a response message returned by the DHCP server, and update a DHCP snooping user binding table according to the response message.

In the existing RFC 4388 standard formulated by the IETF (Internet Engineering Task Force), a DHCP lease relay message is allowed to query information of DHCP lease time from a DHCP server by using any one of parameters including a MAC address, an IP address, and a Client-Identifier. Information of the DHCP lease time of a VM may be searched by using a remote-id sub-option under option 82 in the extended protocol of the RFC 4388 standard.

Figure 9:
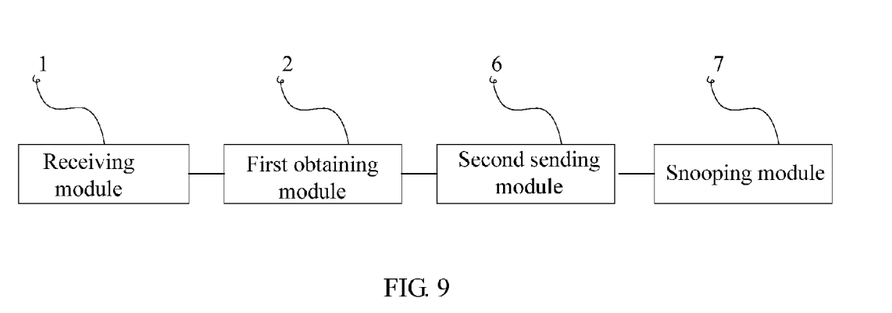
FIG. 9 is a schematic structural diagram of another switch according to the fourth embodiment of the present invention.

In another embodiment of the present invention, a server may also send a DHCP Request message, and update a DHCP snooping user binding table by parsing a DHCP Ack message returned by a DHCP server. That is, the structure of the switch according to the embodiment of the present invention may be as shown in FIG. 9, including:

a receiving module 1, configured to receive a message sent by a server, where the message is used to enable the switch to discover a connected virtual machine interface; and a first obtaining module 2, configured to obtain, from the message, an identifier for indicating whether the virtual machine is migrated, and determine, according to the identifier indicating whether the virtual machine is migrated, whether the virtual machine is a virtual machine that is migrated to the server.

In the embodiment of the present invention, when a VM is migrated, a server to which the VM is migrated sends a message to a switch to notify the switch that the VM is migrated, where the message includes at least an identifier field or flag bit for indicating whether the VM is migrated.

The existing VDP message may be extended by adding a VSI property field for indicating VM migration in the TLV information string. The existing TLV information string is shown in FIG. 2. According to the embodiment of the present invention, a VSI property field may be added at any position in the TLV information string of the VDP message as shown in FIG. 2. Assuredly, a bit may be added in a Reason field in the TLV information string as a flag bit. When the flag bit is 0, the VM is a newly created one. When the flag bit is 1, the VM is a newly migrated one.

When the switch parses the VDP message to acquire that a VM is migrated to the server, the switch may migrate the DHCP snooping service bound to the port. That is, the switch is shown in FIG. 9, further including:

a second sending module 6, configured to send an assistance request message to the server so that the server obtains a MAC address and an IP address of a virtual network interface of the virtual machine, and an IP address of a DHCP server, and sends a DHCP Request message to the DHCP server;

where, the existing VDP message may be extended by adding an identifier field for indicating a request for assistance from a server in the TLV information string; the existing TLV information string is shown in FIG. 2. According to the embodiment of the present invention, an identifier field may be added at any position in the TLV information string of the VDP message as shown in FIG. 2; and after receiving the VDP message, the server parses the VDP message to determine, according to the flag bit, whether to send a DHCP Request message to the DHCP server; and a snooping module 7, configured to snoop a DHCP Ack message returned by the DHCP server, and update a DHCP snooping user binding table according to the DHCP Ack message.

The following uses migration of a multicast group corresponding to the VM as an example to further describe the embodiment of the present invention.

In another embodiment of the present invention, a switch may instruct a VM to send an IGMP report message to a multicast router to enable the VM to immediately join a multicast group. In the prior art, when the switch is using network programs that provide video services, such as, IPTV, video streams, and games, video traffic may be distributed to all connected ports because such type of traffic has generally a multicast Ethernet address. IGMP snooping may be enabled to create a multicast group for locating the traffic to a user that requests the traffic. IGMP querier of the switch may initiate an IGMP member query and allow the nodes that request the traffic to make a response.

Figure 10:
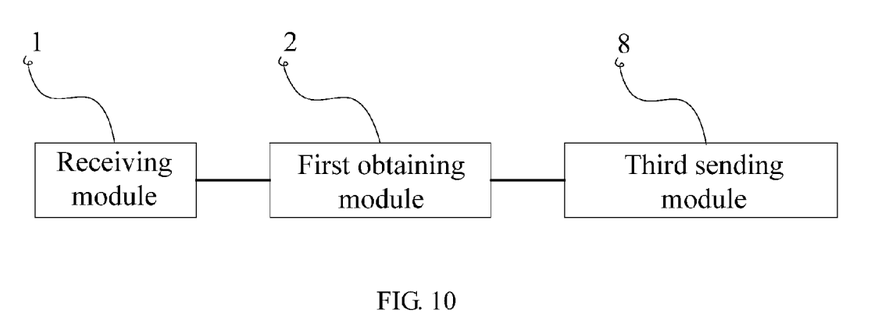
FIG. 10 is a schematic structural diagram of another switch according to the fourth embodiment of the present invention.

Therefore, the structure of the switch according to this embodiment may be as shown in FIG. 10, including:

a receiving module 1, configured to receive a message sent by a server, where the message is used to enable the switch to discover a connected virtual machine interface; and a first obtaining module 2, configured to obtain, from the message, an identifier for indicating whether the virtual machine is migrated, and determine, according to the identifier indicating whether the virtual machine is migrated, whether the virtual machine is a virtual machine that is migrated to the server.

In the embodiment of the present invention, when a VM is migrated, a server to which the VM is migrated sends a message to a switch to notify the switch that the VM is migrated. The message includes at least an identifier field or flag bit for indicating whether the VM is migrated.

The existing VDP message may be extended by adding a VSI property field for indicating VM migration in the TLV information string. The existing TLV information string is shown in FIG. 2. According to the embodiment of the present invention, a VSI property field may be added at any position in the TLV information string of the VDP message as shown in FIG. 2. Assuredly, a bit may be added in a Reason field in the TLV information string as a flag bit. When the flag bit is 0, the VM is a newly created one. When the flag bit is 1, the VM is a newly migrated one.

When the switch parses the VDP message to acquire that a VM is migrated to the server, the switch may enable the VM to join a multicast group. That is, the switch is shown in FIG. 10, further including:

a third sending module 8, configured to send an IGMP query message to the virtual machine so that the virtual machine joins a multicast group by sending an IGMP report message to a multicast server.

Sending an IGMP report by a VM to a multicast server belongs to the prior art. In the prior art, after receiving an IGMP query message, a VM sends an IGMP report; and a multicast server adds the VM to a multicast group after receiving the IGMP report.

According to the embodiment of the present invention, the VDP message may be extended by adding an identifier field or flag bit in the TLV information string of the VDP message so as to notify the switch that the VM is migrated. Further, according to the embodiment of the present invention, services bound to ports of the VM may be migrated to reduce the maintenance cost and improve timeliness of service access after VM migration.

It should be noted that the above third and fourth embodiments only use division of the above functional modules for description. In practice, the above functions may be assigned to different functional modules for implementation as required. To be specific, an internal structure of an apparatus is divided into different functional modules to implement all or part of the above described functions. The above third and fourth embodiments and the method provided in the first and second embodiments belong to the same concept. Therefore, the same part is not detailed again.

Embodiment 5

Figure 11:
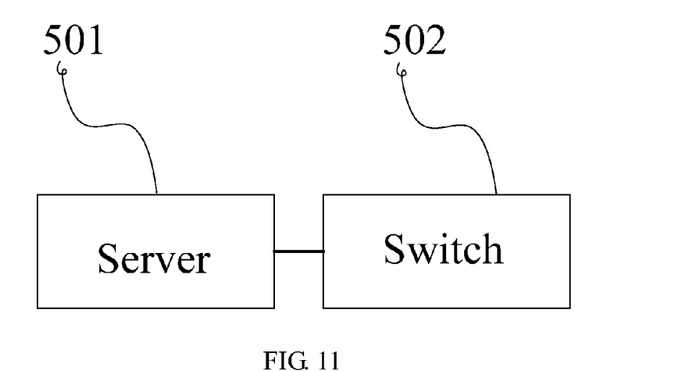
FIG. 11 is a schematic structural diagram of a virtual machine system according to a fifth embodiment of the present invention.

A fifth embodiment of the present invention provides a virtual machine system, and the structure of the system is shown in FIG. 11, including a server 501 configured to host a virtual machine, and a switch 502 configured to be connected to the server 501.

The server 501 is configured to: when a virtual machine is migrated to the server, send a message to the switch 502, where the message is used to enable the switch 502 to discover a connected virtual machine interface.

The switch 502 is configured to receive the message, obtain, from the message, an identifier for indicating whether the virtual machine is migrated, and determine, according to the identifier indicating whether the virtual machine is migrated, whether the virtual machine is a virtual machine that is migrated to the server.

In the embodiments of the present invention, a switch may determine whether an added virtual machine on a server is a newly created one or a migrated one by receiving a message sent by the server and according to an identifier field in the message. In this way, compared with the prior art, it may be accurately acquired whether a virtual machine is migrated to the server, and a binding relationship is established in advance for the migrated virtual machine, thereby improving timeliness of service access after VM migration.

Embodiment 6

A sixth embodiment of the present invention provides a virtual machine system, which is improved based on the fifth embodiment. When the switch accurately acquires that a virtual machine is migrated to a server, services corresponding to the virtual machine bound to ports of the switch may be further migrated. The following uses migration in the DHCP snooping technology as an example to further describe the embodiment of the present invention.

DHCP snooping is a security feature of the DHCP protocol. Untrustworthy DHCP information is filtered by creating and maintaining a DHCP snooping user binding table. The DHCP snooping user binding table includes parameters such as a MAC address, an IP address, lease time, and a VLAN-ID interface of the user in an untrustworthy zone. After DHCP snooping is enabled on an existing switch, the switch snoops DHCP messages, and may extract and record parameters, such as an IP address and a MAC address, from a received DHCP Request or DHCP Ack message.

In an embodiment of the present invention, the switch may trigger a DHCP server to return a response message to update the DHCP snooping user binding table. That is, the system according to the embodiment of the present invention includes: a server 501 configured to host a virtual machine, and a switch 502 configured to be connected to the server.

The server 501 is configured to: when a virtual machine is migrated to the server, send a message to the switch 502, where the message is used to request configuring parameters for the virtual machine on the server 501, and the message includes at least an identifier field for indicating whether the virtual machine is migrated.

The existing VDP message may be extended by adding a VSI property field for indicating VM migration in the TLV information string. The existing TLV information string is shown in FIG. 2. According to the embodiment of the present invention, a VSI property field may be added at any position in the TLV information string of the VDP message as shown in FIG. 2. Assuredly, a bit may be added in a Reason field in the TLV information string as a flag bit. When the flag bit is 0, the VM is a newly created one. When the flag bit is 1, the VM is a newly migrated one.

When determining that the virtual machine is a virtual machine that is migrated to the server, the switch 502 is configured to obtain MAC/VLAN information and/or VSI instance ID information from the message, and generate a DHCP lease query message, and send the lease query message to a DHCP server, and receive a response message returned by the DHCP server, and update the DHCP snooping user binding table according to the response message.

In the existing RFC 4388 standard formulated by the IETF (Internet Engineering Task Force), a DHCP lease relay message is allowed to query information of the DHCP lease time from a DHCP server by using any one of parameters including a MAC address, an IP address, and a Client-Identifier. Information of the DHCP lease time of a VM may be searched by using a remote-id sub-option under option 82 in the extended protocol of the RFC 4388 standard.

In another embodiment of the present invention, a server may also send a DHCP Request message, and update a DHCP snooping user binding table by parsing a DHCP Ack message returned by a DHCP server. That is, the system according to the embodiment of the present invention includes: a server 501 configured to host a virtual machine, and a switch 502 configured to be connected to the server.

The server 501 is configured to: when a virtual machine is migrated to the server, send a message to the switch 502, where the message is used to request configuration of parameters for the virtual machine on the server 501, and the message includes at least an identifier field for indicating whether the virtual machine is migrated.

The existing VDP message may be extended by adding a VSI property field for indicating VM migration in the TLV information string. The existing TLV information string is shown in FIG. 2. According to the embodiment of the present invention, a VSI property field may be added at any position in the TLV information string of the VDP message as shown in FIG. 2.

When determining that the virtual machine is the virtual machine migrated to the server, the switch 502 is configured to send an assistance request message to the server to which the VM is migrated, so that the server obtains a MAC address and an IP address of a virtual network interface of the VM, and an IP address of a DHCP server, and sends a DHCP request message to the DHCP server.

The existing VDP message may be extended by adding an identifier field for indicating a request for assistance from a server in the TLV information string. The existing TLV information string is shown in FIG. 2. According to the embodiment of the present invention, an identifier field may be added at any position in the TLV information string of the VDP message as shown in FIG. 2. After receiving the VDP message, the server parses the VDP message to determine, according to the flag bit, whether to send the DHCP Request message to the DHCP server.

The switch 502 is further configured to snoop the DHCP Ack message returned by the DHCP server, and update the DHCP snooping user binding table according to the DHCP Ack message.

The following uses migration of a multicast group corresponding to the VM as an example to further describe the embodiment of the present invention.

In another embodiment of the present invention, a switch may instruct a VM to send an IGMP report message to a multicast router to enable the VM to immediately join a multicast group. In the prior art, when the switch is using network programs that provide video services, such as, IPTV, video streams, and games, video traffic may be distributed to all connected ports because such type of traffic has generally a multicast Ethernet address. IGMP snooping may be enabled to create a multicast group for locating the traffic to a user that requests the traffic. IGMP query of the switch may initiate an IGMP member query and allow the nodes that request the traffic to make a response.

That is, the system according to the embodiment of the present invention includes: a server 501 configured to host a virtual machine, and a switch 502 configured to be connected to the server.

The server 501 is configured to: when a virtual machine is migrated to the server, send a message to the switch 502, where the message is used to request configuration of parameters for the virtual machine on the server 501, and the message includes at least an identifier field for indicating whether the virtual machine is migrated.

The existing VDP message may be extended by adding a VSI property field for indicating VM migration in the TLV information string. The existing TLV information string is shown in FIG. 2. According to the embodiment of the present invention, a VSI property field may be added at any position in the TLV information string of the VDP message as shown in FIG. 2. Assuredly, a bit may be added in a Reason field in the TLV information string as a flag bit. When the flag bit is 0, the VM is a newly created one. When the flag bit is 1, the VM is a newly migrated one.

When determining that the virtual machine is a virtual machine that is migrated to the server, the switch 502 is configured to send an IGMP query message to the virtual machine so that the virtual machine joins a multicast group by sending an IGMP report message to a multicast server.

Sending an IGMP report by a VM to a multicast server belongs to the prior art. In the prior art, after receiving an IGMP query message, a VM sends an IGMP report; and a multicast server adds the VM to a multicast group after receiving the IGMP report.

In the embodiment of the present invention, the switch 502 may be the switch in the third and fourth embodiments.

According to the embodiment of the present invention, the VDP message may be extended by adding an identifier field or flag bit in the TLV information string of the VDP message, so as to notify the switch that the VM is migrated. Further, according to the embodiment of the present invention, services bound to ports of the VM may be migrated to reduce the maintenance cost and improve timeliness of service access after VM migration.

It should be noted that the preceding fifth and sixth embodiments only use division of the above functional modules for description. In practice, the preceding functions may be assigned to different functional modules for implementation as required. To be specific, an internal structure of an apparatus is divided into different functional modules to implement all or part of the above-described functions. The preceding fifth and sixth embodiments and the method provided in the first and second embodiments belong to the same concept. Therefore, the same part is not detailed again.

Persons of ordinary skill in the art should understand that all or a part of the steps of the preceding methods in the embodiments may be implemented by a program instructing relevant hardware. The program may be stored in a computer readable storage medium. When the program is run, the steps of the preceding methods in the embodiments are performed. The storage medium may be any medium that is capable of storing program codes, such as a ROM, a RAM, a magnetic disk, or an optical disk.

The above descriptions are merely preferred embodiments of the present invention, but are not intended to limit the present invention. Any modification, equivalent replacement, or improvement made without departing from the principle of the present invention should fall within the protection scope of the present invention.

What is claimed is:

1. A virtual machine migration method implemented by a switch, comprising:
   receiving a message sent by a server, wherein the message is used to enable the switch to discover a connected virtual machine interface; wherein the message is a Virtual Station Interface Discovery and Configuration Protocol (VDP) message, and a field of a type length value (TLV) information string of the message comprises a flag bit indicating whether the virtual machine is migrated;
   obtaining, from the message, the flag bit indicating whether a virtual machine is migrated;
   determining, according to the flag bit, that the virtual machine is migrated to the server; and
   migrating a service corresponding to the virtual machine.

2. The virtual machine migration method according to claim 1, wherein the step of migrating comprises:
   obtaining information from the message; wherein the information comprises media access control (MAC) information, virtual local area network (VLAN) information, or virtual station interface (VSI) instance identifier information;

generating a Dynamic Host Configuration Protocol (DHCP) lease query message according to the obtained information, and sending the DHCP lease query message to a DHCP server; and receiving a response message returned by the DHCP server, and updating a DHCP snooping user binding table of a according to the response message.

3. The virtual machine migration method according to claim 1, wherein the step of migrating comprises:

sending an assistance request message to the server, wherein the assistance request message is used to enable the server to obtain a MAC address and an IP address of a virtual network interface of the virtual machine, and an IP address of a DHCP server, and sends a DHCP request message to the DHCP server; and snooping a DHCP response message returned by the DHCP server, and updating a DHCP snooping user binding table according to the DHCP response message.

4. The virtual machine migration method according to claim 1, wherein the step of migrating comprises:

sending an Internet Group Management Protocol (IGMP) query message to the virtual machine, wherein the IGMP message is used to enable the virtual machine to join a multicast group by sending an IGMP report message to a multicast server.

5. A switch, comprising a first communication port, a memory, and a processor coupled to the memory, wherein the processor is configured to:

receive a message sent by a server through the first communication port, wherein the message is a Virtual Station Interface Discovery and Configuration Protocol (VDP) message, and a field of a type length value (TLV) information string of the message comprises a flag bit indicating whether the virtual machine is migrated; and obtain from the message the flag bit indicating whether a virtual machine is migrated, determine according to the flag bit that the virtual machine is migrated to the server, and migrate a service corresponding to the virtual machine.

6. The switch according to claim 5, further comprising a second communication port, wherein the processor is further configured to:

obtain information from the message; wherein the information comprises media access control (MAC) information, virtual local area network (VLAN) information, or virtual station interface (VSI) instance identifier information;

generate a Dynamic Host Configuration Protocol (DHCP) lease query message according to the obtained information, and send the lease query message to a DHCP server through the second communication port; and receive a response message returned by the DHCP server through the second communication port, and update a DHCP snooping user binding table according to the response message.

7. The switch according to claim 5, wherein the processor is further configured to:

send an assistance request message to the server through the first communication port, wherein the assistance request message is used to enable the server to obtain a MAC address and an IP address of a virtual network interface of the virtual machine, and an IP address of a DHCP server;

send a DHCP request message to the DHCP server through the second communication port; and snoop a DHCP response message returned by the DHCP server, and update a DHCP snooping user binding table according to the DHCP response message.

8. The switch according to claim 5, wherein the processor is further configured to:

send an Internet Group Management Protocol (IGMP) query message to the virtual machine through the first communication port, so that the virtual machine joins a multicast group by sending an IGMP report message to a multicast server.

9. A virtual machine system, comprising a hardware server and a hardware switch, wherein the server is configured to send a message to the switch when a virtual machine is migrated to the server, wherein the message is used to enable the switch to discover a connected virtual machine interface, the message is a Virtual Station Interface Discovery and Configuration Protocol (VDP) message, and a field of a type length value (TLV) information string of the message comprises a flag bit indicating whether the virtual machine is migrated; and the switch is configured to receive the message, obtain from the message the flag bit indicating whether the virtual machine is migrated, determine according to the flag bit that the virtual machine is migrated to the server, and migrate a service corresponding to the virtual machine.

10. The virtual machine system according to claim 9, wherein when determining that the virtual machine is a virtual machine that is migrated to the server, the switch is further configured to parse the message to obtain information, wherein the information comprises media access control (MAC) information, virtual local area network (VLAN) information, or virtual station interface (VSI) instance identifier information; generate a Dynamic Host Configuration Protocol (DHCP) lease query message according to the obtained information, and send the DHCP lease query message to a DHCP server; and receive a response message returned by the DHCP server, and update a DHCP snooping user binding table according to the response message.

11. The virtual machine system according to claim 9, wherein when determining that the virtual machine is a virtual machine that is migrated to the server, the switch is further configured to send an assistance request message to the server, so that the server obtains a MAC address and an IP address of a virtual network interface of the virtual machine, and an IP address of a DHCP server, and sends a DHCP request message to the DHCP server, and snoop a DHCP response message returned by the DHCP server, and update a DHCP snooping user binding table according to the DHCP response message.

12. The virtual machine system according to claim 9, wherein when determining that the virtual machine is a virtual machine that is migrated to the server, the switch is further configured to send an Internet Group Management Protocol (IGMP) query message to the virtual machine, so that the virtual machine joins a multicast group by sending an IGMP report message to a multicast server.

* * * * *

UNITED STATES PATENT AND TRADEMARK OFFICE
CERTIFICATE OF CORRECTION

| | | |
|---|---|---|
| PATENT NO. | : 9,600,329 B2 | Page 1 of 1 |
| APPLICATION NO. | : 13/939886 | |
| DATED | : March 21, 2017 | |
| INVENTOR(S) | : Guang Li et al. | |

It is certified that error appears in the above-identified patent and that said Letters Patent is hereby corrected as shown below:

Column 1, Line 35, should read: "When a server creates a VM or a VM is migrating to a server"

Column 4, Lines 8-13, should read: "Step 201: When a VM is migrating, a server to which the VM is migrating sends a message to a switch to notify the switch that the VM is under migration, where the message is used to enable the switch to discover a connected virtual machine interface, and the message includes at least an identifier field or flag bit indicating whether the VM is migrating."

Column 4, Lines 56-61, should read: "Step 301: When a VM is migrating, a server to which the VM is migrating sends a message to a switch to notify the switch that the VM is under migration, where the message is used to enable the switch to discover a connected virtual machine interface, and the message includes at least an identifier field or flag bit indicating whether the VM is migrating."

Column 5, Lines 50-55, should read: "Step 401: When a VM is migrating, a server to which the VM is migrating sends a message to a switch to notify the switch that the VM is under migration, where the message is used to enable the switch to discover a connected virtual machine interface, and the message includes at least an identifier field or flag bit indicating whether the VM is migrating."

<div style="text-align:center">
Signed and Sealed this
Twenty-first Day of May, 2019

Andrei Iancu
*Director of the United States Patent and Trademark Office*
</div>